May 31, 1960 R. K. KAYE 2,938,953

PAYSTATION ADAPTER FOR TELEPHONE SYSTEMS

Filed Jan. 31, 1957

3 Sheets-Sheet 1

INVENTOR.
ROBERT K. KAYE
BY [signature]
AGENT

PAY STATION ADAPTER

May 31, 1960 R. K. KAYE 2,938,953

PAYSTATION ADAPTER FOR TELEPHONE SYSTEMS

Filed Jan. 31, 1957

3 Sheets-Sheet 3

United States Patent Office 2,938,953

Patented May 31, 1960

2,938,953

PAYSTATION ADAPTER FOR TELEPHONE SYSTEMS

Robert K. Kaye, Rochester, N.Y., assignor to General Dynamics Corporation, Rochester, N.Y., a corporation of Delaware Filed Jan. 31, 1957, Ser. No. 637,555

6 Claims. (Cl. 179—6.3)

My invention relates to dial telephone systems in general and more particularly to paystation adapters suitable for use in a dial telephone system where postpay type coin stations are used.

In a dial telephone system involving both subscriber and paystation lines, it is the practice to provide switching apparatus, such as the well known step-by-step type line finder and directively operable selector and connector, for extending connections from a calling line to a called one of the lines. In the case of calling paystation lines, where the coin controlled telephone is of the postpay type, it is necessary to allow a connection to be extended from the calling paystation through the switching apparatus to the called line prior to the deposit of the coin at the paystation. In order to prevent a connection from being extended and a conversation being held between the calling paystation and the called line station without the deposit of a coin, it has been the practice to insert a so-called "paystation adapter" of the type disclosed in Patent 2,367,769, Goddard, between the line finder and the other switching apparatus. Thus, a postpay paystation adapter is arranged to open a connection extended through the switching apparatus and to reclose the connection upon the deposit of the required coin at the paystation in order to allow conversation to take place only after the coin has been deposited. In the past, such paystation adapters have employed means for detecting supervisory signals from the called line which operates to indicate the completion of a connection between the calling and called lines. The supervisory signal detecting means in such an adapter remains effective even after the deposit of a coin at the calling paystation. This necessitates making the coin responsive apparatus, which is effective for inactivating the splitting apparatus, additionally effective to prevent further operations of the supervisory means to thereafter influence the operation of the splitting apparatus. Further, when the supervisory signal detecting means takes the conventional form of a polarized relay having at least one winding in series with the talking conductors of the paystation line, the presence of the relay winding in the talking circuit reduces the transmission efficiency between the calling and called stations.

Accordingly, it is an object of my invention to provide a new and improved paystation adapter.

Another object of my invention is to provide a new and improved paystation adapter having fewer components without sacrificing the number of functions or accuracy of operation.

Another object of my invention is to provide a paystation adapter which introduces no loss in transmission level over and above the losses normally present in conventional telephone systems which do not include paystation adapters.

I accomplish these and other objects in a telephone system having a line with a paystation connected thereto and a plurality of other lines. The system also has means including switching apparatus such as a line finder and a connector of the conventional step-by-step type well known to those skilled in the telephone art for extending connections from the calling paystation to a called line of the other lines. When a call has been extended from the paystation line through the switching apparatus to a called line and the call answered, a supervisory signal is transmitted to the switching apparatus from the called line.

According to the invention, a paystation adapter having control means including means normally in series with the talking connection is enabled in response to the transmission of the supervisory signal from the called one of the lines. The connecting means is operative for blocking the talking connection established between the calling paystation and the called one of the other lines. Other means thereafter responsive to the deposit of a coin at the paystation is effective for disabling the series connected means for the duration of the call, so that the connection established through the switching apparatus is reestablished only upon the deposit of a coin at the calling paystation.

For a better understanding of my invention, reference is made in the following description to the drawings attached to and forming a part of this specification, and in which.

Figure 1:
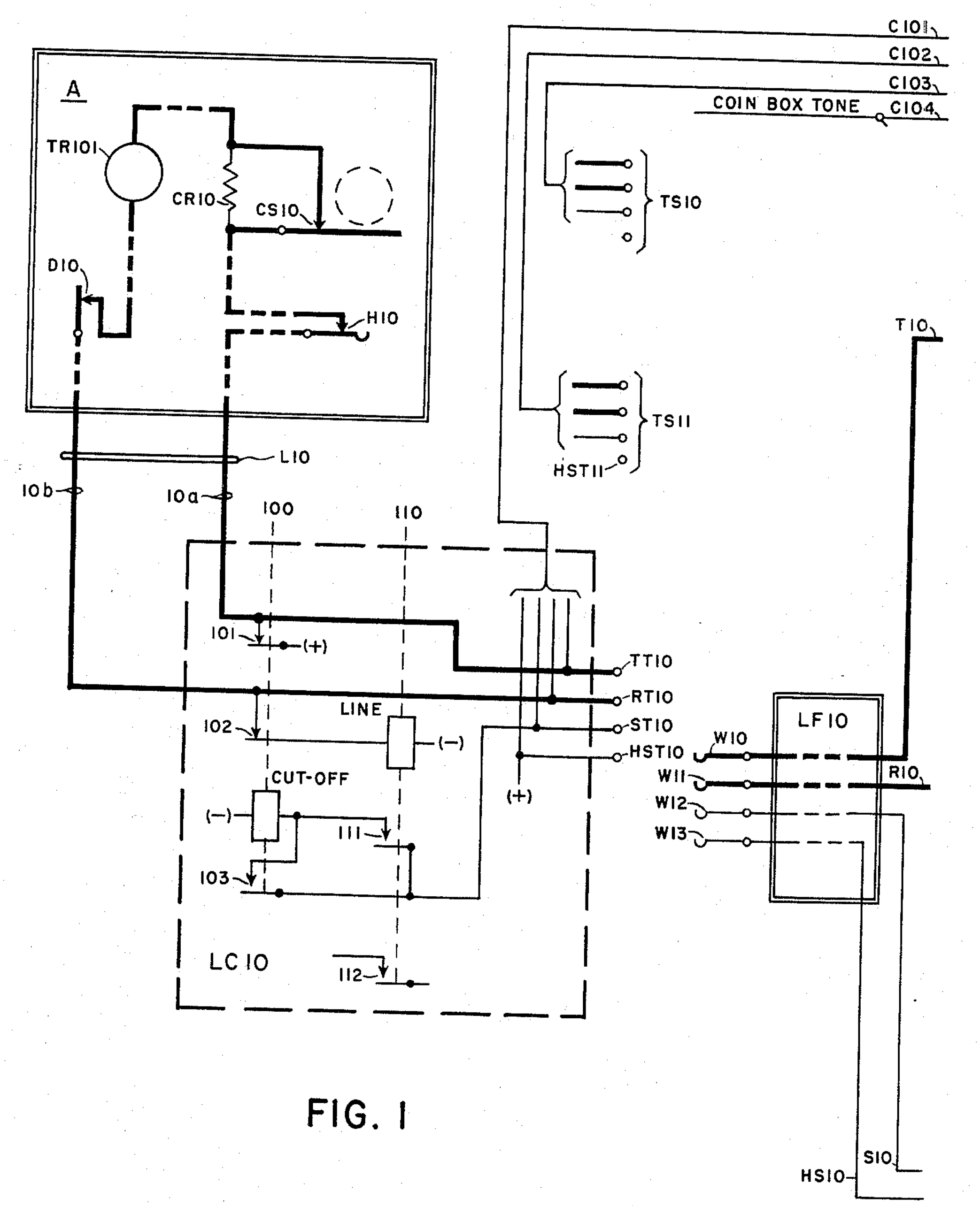
Fig. 1 shows in skeletonized form a paystation, a paystation line, and a line circuit as well as a block representation of a step-by-step type line finder.

Power for operating the apparatus described in the following paragraphs is drawn from a 48 volt battery. The battery is arranged so that the most positive terminal or plate is connected to ground and is hereinafter referred to as "ground" and in the drawings as (+). The most negative, ungrounded plate or terminal of the battery is referred to in the following paragraphs as "battery" and in the drawings as (−).

Figure 3:
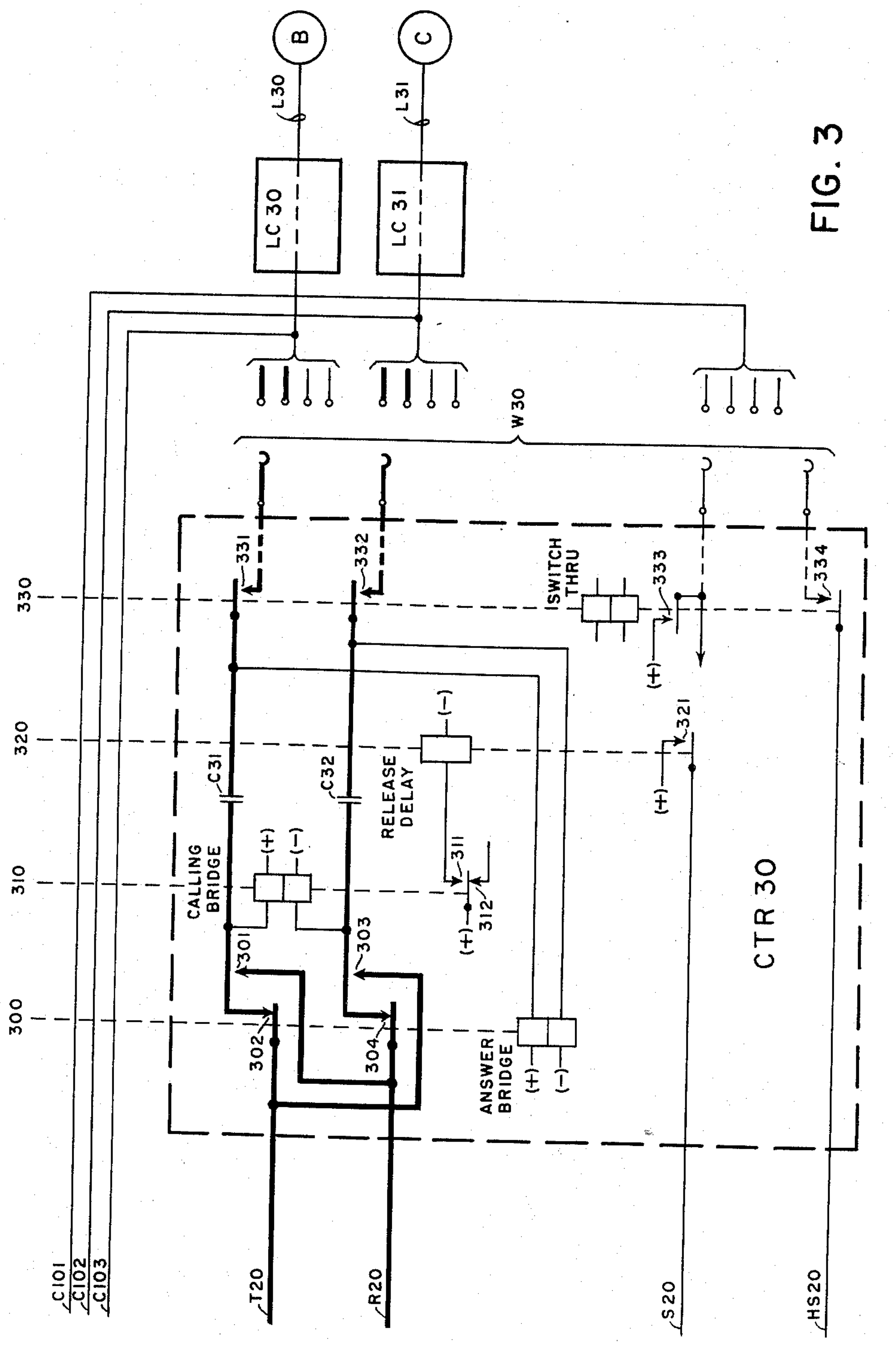
Fig. 3 shows a skeletonized representation of a step-by-step type connector and block representations of subscriber lines, line circuits, and stations.

Referring to Figs. 1 and 3, the system forming the preferred embodiment of my invention includes a plurality of lines, such as L30 and L31, of the subscriber class to which stations B and C, respectively, are connected and lines such as L10 of the paystation class to which postpay type paystations of the type described in Patent 2,367,769, Goddard, are connected. In the following paragraphs I will first describe the extension of a connection from a calling paystation such as A to a called subscriber station such as B. In the following description, the operation of the switching apparatus is confined to general terms except in those places where the operation of the switching apparatus effects the operation of the apparatus forming the embodiment of my invention because the switching apparatus is well understood by those skilled in the telephone art.

To originate a call, the telephone at paystation A is removed from its hookswitch, thereby actuating means including well known hookswitch contacts H10 in order to complete a short between conductors 10*a* and 10*b* of line L10. The completion of the connection is effective for operating line relay 110 within line circuit LC10 in which line L10 terminates. The operating circuit is traced from battery through the winding of relay 110, break contacts 102, conductor 10*b*, dial contacts D10, transmitter TR101, coin signal contacts CS10, now closed hookswitch contacts H10, conductor 10*a*, and break contacts 101 to ground. Relay 110 thereupon operates.

Figure 2:
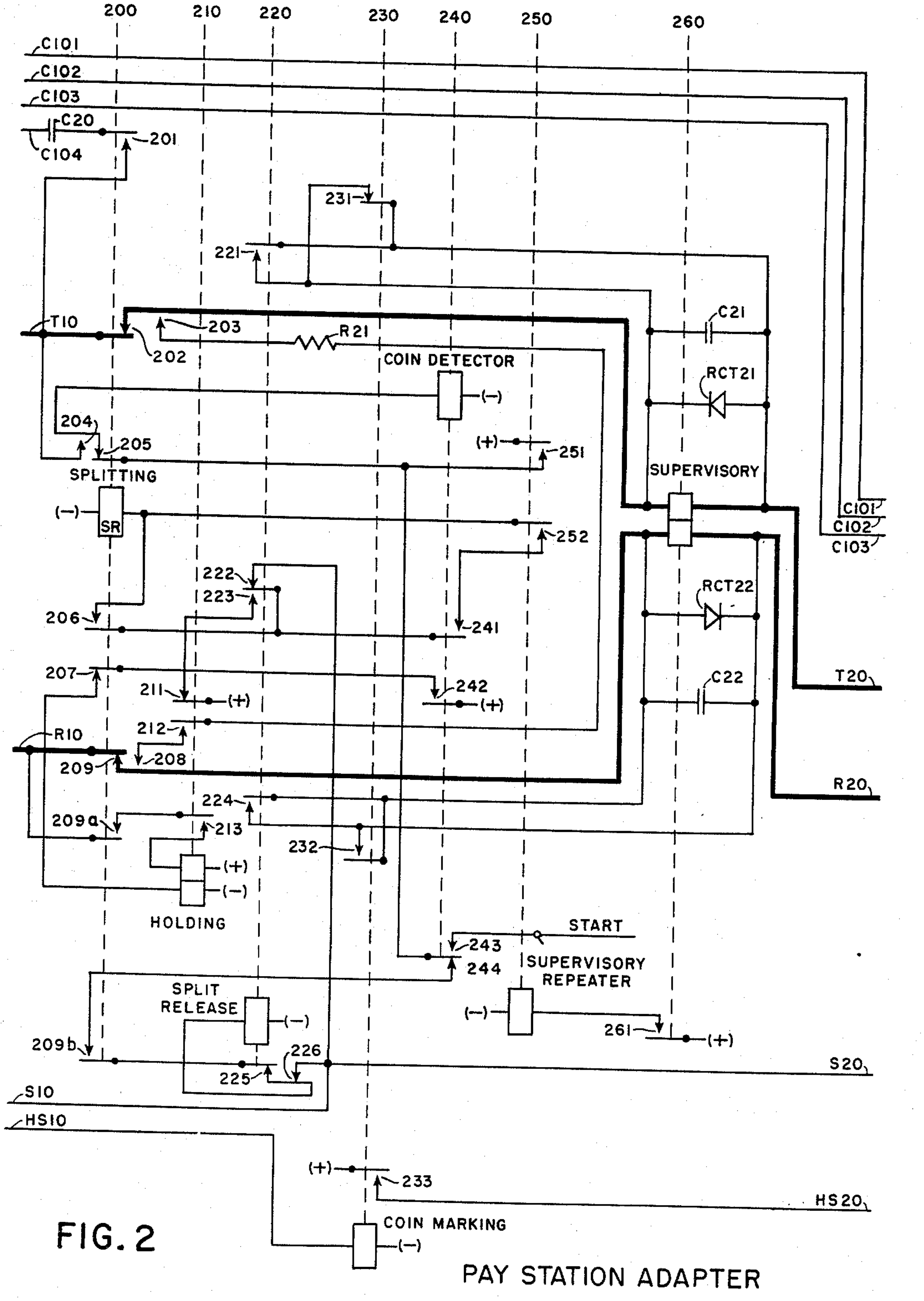
Fig. 2 shows in schematic form a paystation adapter.

The operation of relay 110 is effective for causing other apparatus, not shown, to assign an idle one of the links within the dial office switching apparatus such as line finder LF10 to the incoming call on line L10. Line finder LF10 thereupon operates to advance its wiper set including wipers W10–W13 into engagement with the terminal set individual to line L10 and line circuit LC10. The latter terminals include TT10, RT10, ST10 and HST10. In the preferred embodiment of my invention, line finder LF10 is shown connected to the directively operated connector CTR30 shown in Fig. 3 through the paystation adapter shown in Fig. 2. However, it is to be understood that line finder LF10 might instead be connected through the adapter of Fig. 2 to a first selector having access to connectors CTR30 through its own multiple bank or through any number of intermediate selectors accessible from the first selector multiple bank without departing from the spirit of my invention.

The advance of the wiper set of line finder LF10 to the terminal set individual to line L10 is effective for completing a loop circuit from the station A telephone to the talking channel of connector CTR30. The loop circuit is traced from conductor T20 through break contacts 231 (which are in parallel with the upper winding of relay 260 and capacitor C21), break contacts 202, conductor T10, wiper W10, conductor 10*a*, the station A telephone including the above-described short, conductor 10*b*, wiper W11, conductor R10, break contacts 209, and break contacts 232 (which are in parallel with the lower winding of relay 260 and capacitor C22) to conductor R20. It is pointed out that the portion of the loop circuit lying within the paystation adapter may be considered to be a talking channel having an incoming end including conductors T10 and R10, and an outgoing end including conductors T20 and R20.

Within connector CTR30, the positive and negative terminals of the 48 volt battery are connected to the loop circuit through the upper and lower windings of relay 310 at break contacts 302 and 304, respectively. Current from the battery flowing in this first direction through the loop circuit energizes the transmitter TR10 at station A and operates relay 310. Within the talking channel of the paystation adapter, polarizing means comprising rectifiers RCT21 and RCT22, which are in parallel with the upper and lower windings, respectively, of relay 260, are poled in a direction to pass current when current flows in the aforementioned first direction in the loop circuit. The operation of relay 310 operates release delay relay 320 by closing an obvious energizing circuit at make contacts 311. The operation of relay 320 is effective, among other things, to pass-back ground from make contacts 321 over sleeve conductors S20 and S10 to the winding of cutoff relay 100 within the calling line circuit LC10. Relay 100 thereupon operates and completes a locking circuit for itself through make contacts 103 which are in parallel with make contacts 111. The operation of relay 100 is thereupon effective for disconnecting ground from conductor 10*a* at break contacts 101 and the winding of relay 110 from conductor 10*b* at break contacts 102. Relay 110 thereupon releases. However, relay 100 continues to remain in its operated condition over the above mentioned locking circuit until ground is removed from terminal ST10.

Returning to the consideration of line finder LF10, the advance of wiper W13 into engagement with terminal HST10 of the paystation line circuit LC10 is effective for completing a signaling circuit over conductor HS10 between the line circuit and the paystation adapter to indicate to the paystation adapter that the calling line is of the paystation class. To this end all paystation line circuits are characterized by the presence of ground on the terminal corresponding to terminal HST10, while lines of the subscriber class have no such ground connection on the corresponding terminal. The ground signal applied to wiper W13 and conductor HS10 is effective for operating coin marking relay 230 within the paystation adapter over an obvious circuit.

The operation of relay 230 is effective for removing short circuiting connections around the upper and lower windings of relay 260 as well as polarizing rectifiers RCT21 and RCT22 at break contacts 231 and 232, respectively. Thereupon rectifiers RCT21 and RCT22 are effective to make relay 260 respond as a polarized relay, i.e., to release or remain unoperated in response to the passage of current through the loop circuit in the first direction and to operate in response to the passage through the loop circuit of current of the same value flowing in the opposite direction. As previously mentioned, the rectifiers are poled to be conducting when current flows through the loop circuit in the above described first direction so that the windings of relay 260 are shorted out. Thus, relay 260 is prevented from operating at this time.

Connector CTR30 thereafter responds to trains of directive impulses transmitted over the loop circuit from dial contacts D10 at calling paystation A in order to advance the wiper set of connector CTR30, indicated collectively as W30, into engagement with the connector bank multiple terminal set corresponding to the called line. When the wiper set has been so advanced, a connection is thereafter completed from the above described loop circuit to the conductors of the called line and called line station, such as line L30 and station B, respectively. When the telephone at called station B is answered by removal from its hookswitch, an off-hook supervisory signal is transmitted over line L30 to connector CTR30. Within connector CTR30, supervisory signal responsive means including relay 300 is operated in response to the transmission of the off-hook signal.

The operation of relay 300 is effective for reversing the direction of current flow in the calling line loop by opening break contacts 302 and 304 and reversely connecting the windings of relay 310 to the loop circuit at make contacts 303 and 301. Upon the reversal of current flow in the calling line loop, polarizing rectifiers RCT21 and RCT22 are no longer conductive, so that current flowing in the loop circuit must now flow through the windings of relay 260. Therefore relay 260 operates at this time. The operation of relay 260 is effective for closing an obvious operating circuit for supervisory repeater relay 250 at make contacts 261. Relay 250 thereupon operates.

The operation of the adapter supervisory means including relay 250 is effective for initiating the operation of the adapter circuit connecting and splitting means including relay 200 by first operating coin detecting relay 240. The operating circuit for the latter relay is completed from ground through make contacts 251, break contacts 205, and the winding of relay 240 to battery. The operation of relay 250 is also effective for preparing an operating circuit for splitting relay 200 at make contacts 252.

The operation of relay 240 is effective for completing an operating circuit for holding relay 210 from ground through make contacts 242, break contacts 207, and the lower winding of relay 210 to battery. Relay 210 thereupon operates with effects which are to be explained presently. Thereafter, the operation of relay 240 is effective in response to the operation of relay 250 for completing an operating circuit for splitting relay 200 which is traced from grounded sleeve conductor S20 through break contacts 222, contacts 241 and 252, and the winding of relay 200 to battery. Relay 200 thereupon operates.

The operation of relay 200 is effective for opening the above-traced operating circuits for relays 210 and 240 at break contacts 207 and 205, respectively, and transferring the aforementioned loop circuit from its connection to the battery via the windings of relay 310 into connection with the battery connected winding of relay 240, and the ground connected upper winding of relay 210 by way of the calling line in order to hold relays 240 and 210 operated. This holding circuit is traced from battery through the winding of relay 240, make contacts 204, the above-described loop circuit, make contacts 209a and 213, and the upper winding of relay 213 to ground. Current flowing through the last traced circuit is sufficient to maintain both the low resistance relay 240 and the medium resistance relay 210 in their operated conditions.

The operation of relay 200 is further effective for disconnecting the incoming from the outgoing end of the paystation adapter talking channel at break contacts 202 and 209 in order to open the connection previously established between calling line L10 and called line L30. In order to prevent the release of that portion of the switching apparatus lying between the adapter and the called line connector terminal set, the operation of relay 200 is further effective for completing a holding circuit for maintaining calling bridge relay 310 operated. The holding circuit includes a short connected between conductors T20 and R20 which is traced from ground through the upper winding of relay 310, make contacts 301, conductor R20, the lower winding of relay 260, make contacts 208 and 212, resistor R21, make contacts 203, the upper winding of relay 260, conductor T20, make contacts 303, and the lower winding of relay 310 to battery. Relay 260 is also maintained operated over the holding circuit so that relay 250 is held steadily operated at this time.

The operation of relay 200 is further effective for completing a locking circuit for itself from battery through the winding of relay 200, make contacts 206, and break contacts 222 to ground conductor S20, so that relay 200 is thereafter maintained operated independently of the operation of either relay 240 or relay 250. The operation of relay 200 is further effective for preparing an operating circuit for split release relay 220 at make contacts 209b. The operation of relay 200 is further effective for connecting coin box tone to the calling line loop circuit including conductor T10 through capacitor C20 and make contacts 101. Coin box tone, heard in the receiver, at calling station A informs the user of the station that the system is in condition to respond to the deposit of a coin at the paystation.

Upon the deposit of a coin within the coin receiving apparatus at the paystation, coin signaling contacts CS10 are momentarily opened in order to insert resistor CR10 in series with the above-traced loop circuit (which is now connected to the windings of relays 240 and 210 in the above-described manner). The resulting decrease in current flow through the windings of relays 210 and 240 is sufficient to release relay 240. However, the decreased current is still sufficient to maintain the medium resistance of relay 210 in its operated condition. Relay 240 is part of means also including relay 220 which operates in response to the deposit of a coin at calling paystation A. The further operation of the coin deposit-responsive means is next described. The release of relay 240 is effective in response to the operation of relays 200 and 250 for completing an operating circuit for split release relay 220 which is traced from ground through make contacts 251, break contacts 244, make contacts 209b, break contacts 225, and the winding of relay 220 to battery. Relay 220 thereupon operates. The release of relay 240 is also effective for opening the above-traced operating circuits for relays 200 and 210 at make contacts 241 and 242, respectively. However, opening the last named circuits is without effect at this time, because the previously described holding circuits for the both relays are still effective.

The operation of relay 220 is effective for shorting out the upper and lower windings of relay 260 at make contacts 221 and 224, respectively. Relay 260 releases in order to start the release of the supervisory means including relays 250 and 260. The operation of relay 220 is further effective for opening the above-traced holding circuit for relay 200 at break contacts 222 in order to restore the connecting and splitting means including relay 200 to normal. The effect of releasing the supervisory and splitting means is next explained.

The shorting out of the windings of relay 260 in the above described manner is effective for causing relay 260 to release. Thereupon the above traced operating circuit for relay 250 is opened at make contacts 261. Relay 250 thereafter releases. The release of relay 250 opens the above-traced operating circuits for relays 200 and 240 at make contacts 252 and 251, respectively. The latter relays thereupon release. Thereafter the supervisory means including relays 260 and 250 are inoperative so long as relay 220 remains in its operated condition.

The release of relay 200 is effective for recompleting the connection between the incoming and outgoing ends of the paystation adapter at break contacts 202 and 209 in order to re-establish the connection between calling line L10 and called line L30. The release of relay 200 is also effective for opening the above-traced holding circuit for relays 240 and 210 at make contacts 204 and 209a, for opening its own locking circuit at make contacts 206b, and for removing the connection between the coin box tone source and the calling line loop circuit at make contacts 201.

Returning to the consideration of relay 220, the operation of relay 220 is further effective for completing a locking circuit for itself from grounded conductor S20 through make contacts 226 and the winding of relay 220 to battery, and for opening the above-traced operating circuit for itself at break contacts 225. Relay 220 thereafter remains operated until ground is removed from conductor S20.

The continued operation of relay 220 is effective for insuring that the supervisory means including relays 260 and 250 remain thereafter unoperated during the course of the extension of a call from station A to station B. By preventing the reoperation of the supervisory means, the reoperation of the splitting and coin detecting means is also prevented. By shorting out the windings of supervisory relay 260, the attenuation introduced in the paystation adapter talking channel part of the transmission path between the calling station A and called station B is removed. For that reason the paystation adapter employing my invention has the same loss characteristics of a telephone system in which no paystation adapter is included.

From this point the call between the calling paystation and the called station B proceeds until the connection is released by the restoration of the telephones to their respective hookswitches. The release of the connection is to be described presently.

Returning to the point in the description where splitting means including relay 200 has operated in order to connect the windings of relays 240 and 210 in series, provision is made to prevent the user of the paystation A telephone from attempting to hold a conversation with the called station without depositing a coin where the attempt takes the form of a momentary operation of the paystation A hookswitch. Operation of the hookswitch momentarily opens the paystation loop circuit at hookswitch contacts HS10. As in the above described case, relay 240 releases. In addition, the opening of hookswitch contacts H10 also opens the holding circuit including the upper winding of relay 210, so that relay 210 also releases at this time. The release of relay 210 is effective for opening the above described holding circuit for relay 310 within connector CTR30 including resistor R21 at make contacts 212. Meanwhile, the release of relay 210 is effective in response to the operation of split release relay 220 for closing an alternate holding circuit for relay 200 in order to insure that the re-establishment of a connection between the calling line loop circuit and the talking channel of connector CTR30 is held off until after the holding circuit for relay 310 has been opened. The alternate holding circuit for relay 200 is traced from ground through break contacts 211, make contacts 223 and 206, and the winding of relay 200 to battery. Thus, relay 200 is maintained in its operated condition so long as relay 220 is held operated. With the holding circuit for relay 310 opened, connector CTR30 thereafter releases in the next described manner.

At the conclusion of the extension of a connection from paystation A to called station B, or upon an attempt to avoid payment for the call by opening the hookswitch contacts at the calling paystation in the above described manner, a disconnect signal is transmitted to connector CTR30 in the form of a prolonged opening of either of the above described circuits used for placing a short between conductors T20 and R20. In this manner, calling bridge relay 310 is released to open the operating circuit of slow release type relay 320 at make contacts 311 for an interval of time sufficient to allow relay 320 to release. Other apparatus well understood by those skilled in the art is energized in response to the release of relay 320 for restoring wiper set W30 of connector CTR30 to its normal position, thereby opening the connection between connectors CTR30 and the called line and station. The release of relay 320 is further effective for opening the ground connection to conductor S20 at make contacts 321. Thereupon the locking circuit of split release relay 220 within the paystation adapter is opened and the previously mentioned operating circuit for cutoff relay 100 in calling line circuit LC10 is opened. Relays 220 and 100 thereupon release. Similarly, apparatus within line finder LF10 is released at this time in order to restore the wiper set including wipers W10–W13, inclusive, to its normal position in order to further disconnect the calling station line from the switching apparatus of the telephone system. The restoration of line finder LF10 to its normal position opens the previously described operating circuit for coin marking relay 230 in an obvious manner. The subsequent release of relay 230 restores the short circuit connections normally present around the upper and lower windings of relay 260 at break contacts 231 and 232, respectively. The restoration of relay 220 to its normal condition is effective for opening the above described shorts around the upper and lower windings of relay 260 at make contacts 221 and 224, respectively; further, the release of relay 220 is effective for partially restoring the first described holding circuit for relay 200 by closing break contacts 222 and for repreparing its own operating circuit by closing break contacts 225. The paystation adapter as well as the preceding line finder LF10 and the succeeding switching apparatus including connector CTR30 are now in normal condition and ready for a further use.

The foregoing description has been confined thus far to the consideration of a call from a paystation line, such as L10, to another line within the system. The switching apparatus including line finder LF10 and connector CTR30 may also be utilized for extending calls from a subscriber station such as C on line L31 to another subscriber station line such as L30. In order to extend such a call, the subscriber at station C removes his telephone from its hookswitch in order to energize line circuit LC31 in which line L31 terminates in the usual manner. The energization of line circuit LC31 is effective for causing an idle line finder such as LF10 to be advanced so that the wiper set including wipers W10–W13, inclusive, engages terminal set TS11 on which the conductors of line L31 as well as the usual sleeve conductor of line circuit LC10 are terminated. Thereafter the call is extended through line finder LF10 to connector CTR30 in the previously described manner. In the case of calls extended from subscriber line circuits, however, no ground is found on the terminal engaged by wiper W13, so that coin marking relay 230 within the paystation adapter succeeding line finder LF10 remains in unoperated condition throughout the extension of a call from the subscriber line. With relay 230 in its normal condition, the above described short normally present around each winding of relay 260 insures that relay 260 will remain in its normal condition throughout the extension of the call. Thus the supervisory means including relays 260 and 250 within the adapter circuit is made ineffective regardless of the transmission of off-hook signals in the previously described manner from called station B on line L30. The continued presence of a short around the windings of relay 260 maintains the transmission level and calls extended from one subscriber station to another through the switching apparatus at the same level that would be maintained in the event that the paystation adapter were omitted from the above described telephone system.

In summary, with the above described paystation adapter, control means is provided to operate in response to the operation of the switching apparatus supervisory means. The adapter also includes means operative in response to the deposit of a coin at the paystation. The control means includes means for connecting the coin deposit responsive means to the calling paystation line and for blocking the connection between the calling and called lines. The control means also includes supervisory responsive means in the form of a polarized relay having at least one winding in series with the loop of the calling paystation line and the talking connection established through the switching apparatus. The polarized relay is arranged to be normally unoperated and to operate in response to the reversal of current flow within the calling line loop circuit which occurs upon the operation of the switching apparatus supervisory means. The supervisory responsive means enables the control means to carry out the above-described functions. Thus, upon the operation of the control means, the coin deposit responsive means operates (when a coin is deposited) to disable the control means. The disabling operation is accomplished by the operation of means included within the coin deposit responsive means for releasing the above referred to connecting means to its normal condition, thereby disconnecting the coin deposit responsive means from the paystation line and removing the block in the circuit between calling and called lines. The releasing means is also operative for constructively disconnecting the supervisory responsive means from the talking connection established through the switching apparatus by shorting out the polarized relay winding or windings. Thereafter, the supervisory responsive means is inoperative when subsequently transmitted supervisory signals are received at the paystation adapter. The adapter also includes means for maintaining the operated coin deposit responsive means in its operated condition for the duration of the call so that the supervisory responsive means and the connecting means are unaffected by the transmission of supervisory signals from the called line to the switching apparatus throughout the remainder of the call.

In order to make the paystation adapter, located within the switching apparatus, discriminate between calls extended from paystation and non-paystation lines, means is provided within the adapter to be normally effective for making the supervisory responsive means and, consequently, the control means inoperative. This is accomplished by means independent from the above-mentioned releasing means that was described as normally effective to constructively disconnect the polarized relay from the talking connection by shorting out the polarized relay winding or windings. The independent means is operated in response to the extension of a call from a paystation line through the switching apparatus so that the polarized relay operates upon the opening of the short around its winding or windings. Thus the paystation adapter is ineffective during the extension of calls from subscriber lines and is made effective only when calls are extended from calling paystation lines.

While I have described in the above paragraphs the preferred embodiment of my invention, other modifications of the apparatus will readily occur to those skilled in the art. I, therefore, aim in the appended claims to cover all such modifications as fall within the true spirit and scope of my invention.

What is claimed is:

1. In a telephone system, a line comprising conductors having a paystation connected thereto, a plurality of other lines, switching apparatus directively operable under the control of said paystation for extending a connection from said paystation to a called one of said other lines, and supervisory means within said switching apparatus operative in response to the transmission of an offhook signal from the called one of said lines; the combination comprising: means including a relay having windings in series with said talking connection for responding to a signal from said supervisory means, control means responsive to the operation of said relay for blocking the talking connection established between said paystation and the called one of said other lines, means operative in response to the deposit of a coin at said paystation for shorting out said relay windings in order to disable said relay and for releasing said control means from its operated condition, said control means being further operative for connecting said coin responsive means to said paystation, and means operative for maintaining said coin responsive means operative throughout the duration of the connection.

2. In a telephone system, a line comprising conductors having a paystation connected thereto, a plurality of other lines, switching apparatus directively operable under the control of said paystation for extending a connection to a called one of said other lines, a battery in said switching apparatus, a loop circuit including said conductors for extending a connection from said paystation to said battery in order to cause current to flow through said loop circuit in a first direction, means operative in response to the deposit of a coin at said paystation, connecting means for transferring said loop circuit from its connection to said battery into connection with said coin deposit responsive means, means within said switching apparatus operative in response to the transmission of an off-hook signal from the called one of said other lines for reversing the direction of current flow through said loop circuit, supervisory means including a polarized relay having at least one winding in series with said loop circuit operative in response to the reversal of current flow in said loop circuit for operating said connecting means, said coin deposit responsive means being operative for shorting out said relay winding in order to render said supervisory means inoperative with respect to said connecting means, and means for thereafter maintaining said coin deposit responsive means in operated condition, whereby said supervisory means is prevented from responding to further signals transmited from said switching apparatus after the deposit of a coin at said paystation.

3. In a telephone system including a first plurality of lines having paystations connected thereto, a second plurality of other lines, and switching apparatus for establishing a talking connection between a calling one of said lines and a called one of said lines, the combination comprising: means including means within said switching apparatus in series with the talking connection to be enabled in response to the transmission of an answering supervisory signal from a called one of said lines for blocking the talking connection, means thereafter operative in response to the deposit of a coin at the calling one of said paystations for disabling said series-connected means for the duration of the connection, and class of service means within said switching apparatus normally effective for making said series-connected means inoperative, said class of service means being operative in response to the extension of a connection from a calling one of said paystation lines through said switching apparatus for making said series-connected means operative, whereby said connection blocking means is effective only in the case of calls extended from calling ones of said paystation lines.

4. The system set forth in claim 3 wherein said series-connected means is normally connected to said switching apparatus, said coin deposit responsive means is also operative for effectively disconnecting said series-connected means from said switching apparatus, and said class of service means normally constructively disconnects said series-connected means from said switching apparatus and is operative for constructively connecting said series-connected means to said switching apparatus.

5. In a telephone system including a first plurality of lines having paystations connected thereto, a second plurality of other lines, and switching apparatus for establishing a talking connection between a calling one of said lines and a called one of said lines, supervisory means within said switching apparatus operative in response to the transmission of an answering supervisory signal from the called one of said lines, a paystation adapter within said switching apparatus, said adapter including control means and means responsive to the deposit of a coin at a calling one of said paystations, said control means having means in series with an established talking connection to be enabled in response to the operation of said supervisory means for blocking the talking connection established through said switching apparatus and for connecting said coin deposit responsive means to the calling one of said lines, said coin deposit responsive means being effective for disabling said series-connected means and the remainder of said control in order to make said series-connected means unresponsive to the operation of said supervisory means and to re-establish a talking connection through said switching apparatus, means for maintaining said coin deposit responsive means in operative condition for the duration of the connection, and class of service means within said switching apparatus normally effective for making said series-connected means inoperative, said class of service means being operative in response to the extension of a connection from any one of said paystation lines through said switching apparatus for making said series-connected means operative in order to make said connection blocking means effective only in the case of calls extended from calling ones of said paystation lines.

6. In a telephone system; a first plurality of lines having paystations connected thereto; a second plurality of lines having subscriber stations connected thereto; each of said lines including a pair of conductors; switching apparatus directively operable from calling ones of said lines for extending a connection from the calling one of said lines to a called one of said lines; a battery in said switching apparatus; a loop circuit including said conductors of the calling one of said lines for extending a connection from said station on the calling one of said lines to said battery in order to cause current to flow through said loop circuit in a first direction; a paystation adapter within said switching apparatus including means operative in response to the deposit of a coin at a calling one of said paystations, connecting means, and supervisory means; said connecting means being operative for transferring said loop circuit from its connection to the called one of said lines to said battery into connection with said coin deposit responsive means; means in said switching apparatus operative in response to the transmission of an off-hook signal from the called one of said lines for reversing the direction of current flow through said loop circuit; said supervisory means including a polarized relay having at least one winding in series with said loop circuit and being operative in response to the reversal of current flow in said loop circuit for operating said connecting means; said coin deposit responsive means operative for shorting out said relay winding in order to render said supervisory means inoperative with respect to said connecting means following the deposit of a coin at said paystation; and means normally effective for shorting out said relay winding and operative only during the extension of a connection from a calling one of said paystation lines to said switching apparatus for opening the short around said relay winding; whereby the apparatus within said paystation adapter is effective only during the extension of calls from said any one of said paystation lines.

References Cited in the file of this patent

UNITED STATES PATENTS

| | | |
|---|---|---|
| 2,137,409 | Martin | Nov. 22, 1938 |
| 2,214,245 | Evers | Sept. 10, 1940 |
| 2,281,062 | Brubaker | Apr. 28, 1942 |
| 2,729,703 | Faulkner et al. | Jan. 3, 1956 |
| 2,820,847 | King | Jan. 21, 1958 |